United States Patent
Adams et al.

(10) Patent No.: US 9,349,386 B2
(45) Date of Patent: May 24, 2016

(54) SYSTEM AND METHOD FOR PROCESSOR WAKE-UP BASED ON SENSOR DATA

(71) Applicant: ANALOG DEVICES TECHNOLOGY, Hamilton (BM)

(72) Inventors: Robert Adams, Acton, MA (US); Maikael Mortensen, Lyngby (DK)

(73) Assignee: Analog Device Global, Hamilton (BM)

( * ) Notice: Subject to any disclaimer, the term of this patent is extended or adjusted under 35 U.S.C. 154(b) by 199 days.

(21) Appl. No.: 13/788,062

(22) Filed: Mar. 7, 2013

(65) Prior Publication Data
US 2014/0257821 A1  Sep. 11, 2014

(51) Int. Cl.
| | | |
|---|---|---|
| G10L 11/06 | (2006.01) |
| G10L 21/06 | (2013.01) |
| G10L 25/93 | (2013.01) |
| G10L 25/48 | (2013.01) |
| G06F 1/32 | (2006.01) |
| G10L 25/84 | (2013.01) |
| G10L 25/87 | (2013.01) |
| G10L 25/78 | (2013.01) |
| G10L 15/08 | (2006.01) |
| G10L 15/28 | (2013.01) |

(52) U.S. Cl.
CPC .............. *G10L 21/06* (2013.01); *G06F 1/3206* (2013.01); *G10L 25/48* (2013.01); *G10L 25/93* (2013.01); *G10L 15/28* (2013.01); *G10L 25/78* (2013.01); *G10L 25/84* (2013.01); *G10L 25/87* (2013.01); *G10L 2015/088* (2013.01); *G10L 2025/783* (2013.01); *G10L 2025/786* (2013.01)

(58) Field of Classification Search
CPC combination set(s) only.
See application file for complete search history.

(56) References Cited

U.S. PATENT DOCUMENTS

| | | | |
|---|---|---|---|
| 4,827,517 A * | 5/1989 | Atal et al. ....................... 704/218 |
| 5,915,028 A * | 6/1999 | Chahabadi ....................... 381/15 |
| 6,453,285 B1* | 9/2002 | Anderson et al. ............. 704/210 |
| 6,480,589 B1* | 11/2002 | Lee ......................... G11C 16/26 379/142.04 |
| 6,901,270 B1* | 5/2005 | Beach ........................... 455/563 |
| 7,774,204 B2 | 8/2010 | Mozer et al. |
| 8,023,673 B2* | 9/2011 | Vandali .............. A61N 1/36032 381/312 |
| 8,935,157 B2* | 1/2015 | Kim et al. ...................... 704/211 |
| 2004/0136473 A1* | 7/2004 | Yang et al. ..................... 375/322 |
| 2004/0267523 A1* | 12/2004 | Kim ............................... 704/205 |
| 2005/0102133 A1* | 5/2005 | Rees ............................. 704/205 |
| 2008/0082319 A1* | 4/2008 | Sebestian et al. .......... 704/200.1 |
| 2008/0189100 A1* | 8/2008 | LeBlanc et al. ............... 704/207 |
| 2011/0246206 A1* | 10/2011 | Kim et al. ..................... 704/500 |
| 2013/0223635 A1* | 8/2013 | Singer et al. .................... 381/56 |
| 2014/0012573 A1* | 1/2014 | Hung et al. .................... 704/233 |
| 2014/0358552 A1* | 12/2014 | Xu ................................. 704/275 |

* cited by examiner

*Primary Examiner* — Richard Zhu
(74) *Attorney, Agent, or Firm* — Patent Capital Group

(57) ABSTRACT

A system for processor wake-up based on sensor data includes an audio buffer, an envelope buffer, and a processor. The audio buffer is configured to store a first data from a sensor. The first data is generated according to a first sampling rate. The envelope buffer is configured to store a second data, which is derived from the first data according to a second sampling rate, which is less than the first sampling rate. The processor is configured to wake up periodically from an idle state and read the second data from the envelope buffer. If the second data indicates an activity, the processor is configured to read the first data from the audio buffer. If the second data does not indicate an activity, the processor is configured to return to the idle state.

20 Claims, 4 Drawing Sheets

SYSTEM AND METHOD FOR PROCESSOR WAKE-UP BASED ON SENSOR DATA

FIELD OF THE DISCLOSURE

This disclosure relates in general to the field of electronic devices and, more particularly, to a system and method for processor wake-up based on sensor data.

BACKGROUND

A voice command device (VCD) is a device controlled with human voice. By dispensing with buttons, dials and switches, consumers can easily operate appliances with their hands full or while doing other tasks. For example, consumers can operate their television or mobile phones with voice-activated commands. VCDs can be speaker-independent, responding to multiple voices, regardless of accent or dialectal influences. VCDs can be found in various applications, including computer operating systems, commercial software for computers, mobile phones, cars, call centers, and internet search engines.

SUMMARY OF THE DISCLOSURE

A system for processor wake-up based on sensor data includes an audio buffer, an envelope buffer, and a processor. The audio buffer is configured to store a first data from a sensor. The first data is generated according to a first sampling rate. The envelope buffer is configured to store a second data, which is derived from the first data according to a second sampling rate, which is less than the first sampling rate. The processor is configured to wake up periodically from an idle state and read the second data from the envelope buffer. If the second data indicates an activity, the processor is configured to read the first data from the audio buffer. If the second data does not indicate an activity, the processor is configured to return to the idle state. The envelope buffer can be shorter than the audio buffer.

In specific embodiments, the system further includes an analog-to-digital converter configured to generate the first data in a digital format according to the first sampling rate from an analog signal. In some embodiments, the system further includes a direct memory access (DMA) controller that facilitates reading the audio buffer and the envelope buffer. A timer may also be included in specific embodiments, configured to send an interrupt to the processor periodically. In particular embodiments, the system further includes an envelope detector configured to detect an envelope of the first data and a decimator configured to downsample the envelope to generate the second data according to the second sampling rate. The system can further include a bandpass filter that is configured to filter the first data and feed the filtered data to the envelope detector.

In some embodiments, the first data may be generated from audio signals. In such embodiments, the system is configured to perform the following operations: filtering out frequencies in the first data that are beyond a normal human voice range to generate a subset of the first data, detecting the envelope of the subset, determining a difference between the envelope and a negative peak value, and detecting an activity if the difference exceeds a predetermined threshold. Additional operations can include normalizing the envelope of the subset, comparing the normalized envelope with a second negative peak value, if the normalized envelope is not less than the second negative peak value during a predetermined number of clock cycles, incrementing the second negative peak value by a fixed amount to obtain the negative peak value, and if the normalized envelope is less than the second negative peak value, setting the negative peak value to the second negative peak value.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
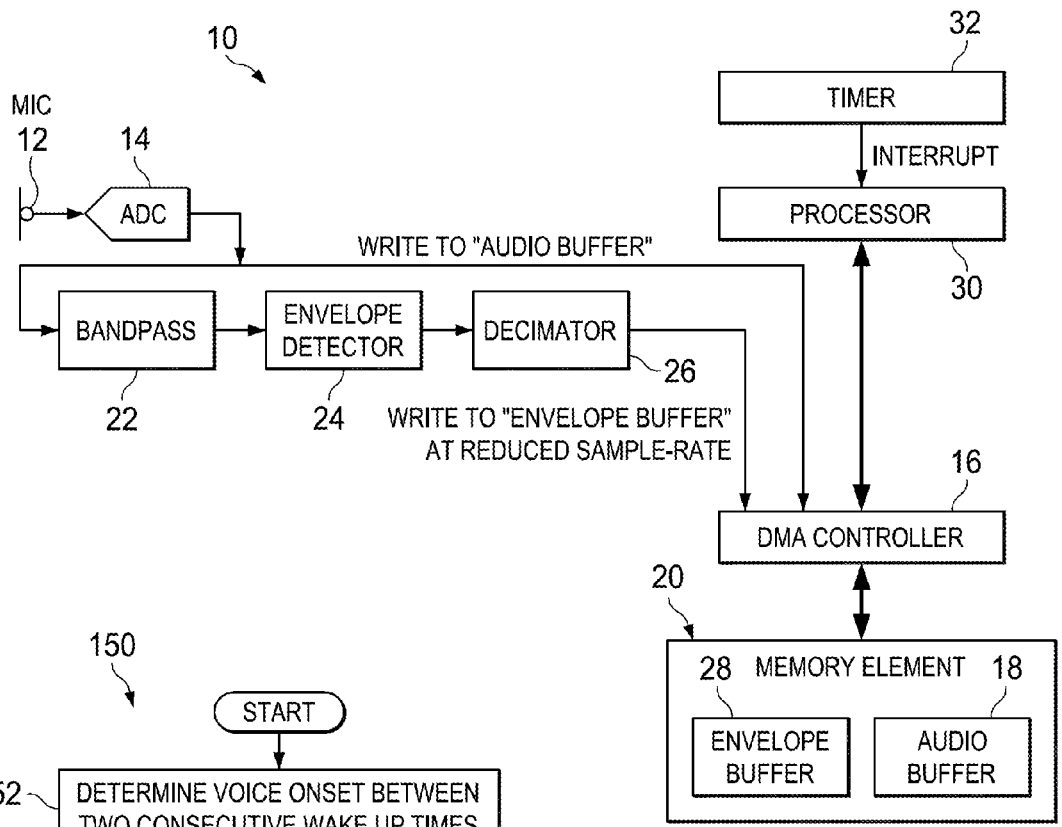
FIG. 1 is a simplified circuit diagram of a system for processor wake-up based on sensor data in accordance with one embodiment.

The present disclosure provides for a system in which a sensor such as a microphone can wake up another system, such as a microprocessor, based on one or more detected change in the sensor's output. In general, VCDs, such as cell-phones, provide for always-on monitoring of the external sound field, so that the VCD can emerge from "stand by" mode on a voice command. Such monitoring may be implemented using an ultra-low power always-on trigger-detector circuitry that detects a change in the sensor output and then wakes up the microprocessor. However, the scheme requires many algorithms, such as voice recognition algorithms, that require pre-trigger data to operate effectively.

To overcome this drawback, some systems use an always-on circular memory buffer to store data continuously, so that when the low-power sensor-detect circuitry detects an activity, the processor has access to pre-trigger data stored in the circular memory buffer. As used herein, the term "activity" may refer to a change in amplitude (or other parameter) of the natural signal (e.g., audio signal) received at the sensor. Other systems may eliminate the always-on low power trigger detector, and use an always-on circular buffer (e.g., a data structure that uses a single, fixed-size buffer as if it were connected end-to-end). The circular buffer starts empty and is typically of a predetermined length. The oldest entries are removed first from the circular buffer when (and as) needed. When the circular buffer is full and a subsequent write is performed on the circular buffer, the oldest data is overwritten. Sometimes, instead of overwriting, an exception or error may be raised, based on the semantics of the buffer routines or applications using the circular buffer.

The processor may be set to wake up periodically from an idle state (e.g., processor state wherein the processor uses low power and it is not executing any applications; can be also called standby mode, low-power mode, or sleep mode) and check the circular buffer to determine if any activity has occurred. In the idle state, various circuits and portions of the processor can be turned off. The more the number of circuits turned off, the lower the power consumption and the longer is the wake-up time. If there no activity, the processor can go back to the idle state. If the duty cycle of the processor being active is small, then the average power consumed by the processor will also be small. In such scenarios, the circular buffer size has to be large enough compared to the processor wake-up interval, so that there is enough margin to recover pre-trigger data needed by the various voice recognition and other algorithms. For example, to store 200 ms of audio data at a sample rate of 16 KHz may require a circular buffer length of 3K words. The processor may therefore have to spend a long time reading the circular buffer and looking for triggers that indicate activities, which can lead to large power consumption by the processor due to the longer waking period.

Turning to FIG. 1, FIG. 1 is a simplified block diagram of a system 10 for processor wake-up based on sensor data. System 10 includes a sensor 12 (e.g., a microphone or mic) that captures natural signals (e.g., auditory signals, optical signals, etc.) and converts them into analog signals (e.g., voltage signal, current signal). Sensor 12 may be coupled to an analog-to-digital converter (ADC) 14. The analog signal from sensor 12 may be converted by ADC 14 according to a first sampling rate into a first data, comprising a digital signal. "Sampling rate" as used herein includes the number of samples per unit time taken from a continuous analog signal to make a discrete digital signal. A direct memory access (DMA) controller 16 may facilitate storing the first data in an audio buffer 18 of memory element 20. As used herein, the term "audio buffer" includes a buffer (e.g., circular buffer) configured to store the first data from sensor 12. "Data," as used herein in this specification, refers to values of quantitative items, such as the digital signals from ADC 14.

According to various embodiments, a bandpass filter ("bandpass") 22 may also process the first data from ADC 14. Bandpass 22 may remove frequencies in the first data that are outside a predefined "normal" human voice range (e.g., 300 Hz to 3400 Hz). The output signal from bandpass 22, which may form a subset of the first data, may be passed through an envelope detector 24 that can determine the envelope of the subset. As used herein, the term "envelope" of data includes a curve outlining extremes of amplitude of the data. The envelope may be generated by envelope detector 24 based on any suitable parameter associated with the subset of the first data. For example, the envelope may be detected based on an appropriate parameter of the subset of the first data, such as root mean square (RMS), average, peak and quasi-peak.

In embodiments where the envelope detection is based on the peak, envelope detector 24 includes a rectifier followed by a low-pass filter to extract a baseband signal consisting of the slowly (relative to the ADC sampling rate) time-varying amplitude of the signal from bandpass 22. In embodiments where the envelope detection is based on the quasi-peak, envelope detector 24 includes an additional lossy integrator that has a rapid rise time and longer fall time. In embodiments where the envelope detection is based on RMS, the envelope output from envelop detector 24 is voltage that is proportional to the envelope, independent of the peak-to-average ratio, of the signal from bandpass 22. In embodiments where the envelope detection is based on the average, envelope detector 24 may include an average detector in addition to the RMS envelope detector. Envelope detector 24 may also be implemented using software, for example, based on many any one or more of different well-known algorithms including root mean square (RMS), average, peak, quasi-peak, or other types of energy detection algorithms.

In various embodiments, envelope detector 24 may form a part of a voice activity detector (VAD). In some embodiments, VAD may be implemented partly in hardware (e.g., envelope detector 24) and partly in software, which may be imbedded in envelope detector 24, and/or implemented separately from envelope detector 24. The output signal of envelope detector 24 may vary more slowly than its input signal from bandpass filter 22, and the output signal may be decimated (e.g., downsampled, subsampled) to a second (lower) sampling rate by decimator 26 to generate a second data. The second sampling rate is thus less than the first sampling rate.

The downsampled second data from decimator 26 may be stored in an envelope buffer 28 of memory element 20. As used herein, the term "envelope buffer" includes a buffer (e.g., circular buffer) configured to store the second data from sensor 12. Audio buffer 18 may record the same absolute length of time as envelope buffer 28, but because the input to envelope buffer 28 is decimated to the lower second sampling rate, the buffer size of envelope buffer 28 can be correspondingly smaller than the buffer size of audio buffer 18. Thus, envelope buffer 28 may be shorter than audio buffer 18. In some embodiments, the output of envelope detector 24 may optionally be converted to a log scale before being decimated and written to envelope buffer 28 as the second data. The amount of memory access and computation for VAD execution may be reduced in some embodiments due to the shorter size of envelope buffer 28.

A processor 30 may communicate with memory element 20 via DMA controller 16. For example, processor 30 may initiate a read operation with DMA controller 16, which starts the memory access process. DMA controller 16 can generate addresses and initiate memory read or write cycles. DMA controller 16 can contain several registers that can be written and read by processor 30. The registers include a memory address register, a byte count register, and one or more control registers. The control registers specify the input/output (I/O) port to use, the direction of the transfer (e.g., reading from the I/O device or writing to the I/O device), the transfer unit (e.g., byte at a time or word at a time), and the number of bytes to transfer in one burst.

To carry out an input, output or memory-to-memory operation, processor 30 may initialize DMA controller 16 with a count of the number of words to transfer, and the memory address (e.g., of envelope buffer 28) to use. DMA controller 16 may provide addresses and read/write control lines to memory element 20. Each time a word of data is ready to be transferred between processor 30 and memory, DMA controller 16 may increment its internal address register until the full block of data is transferred. Various other modes of memory access may be implemented within the broad scope of the embodiments. In some embodiments, DMA controller 16 may comprise a portion of (or be located in) processor 30.

Processor 30 can execute any type of instructions associated with the data to achieve the operations detailed herein in this Specification. In one example, processor 30 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), or an application specific integrated circuit (ASIC) that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term "processor." For example, processor 30 can include at least one of a DSP, and microcontroller.

A timer 32 may periodically interrupt processor 30 and cause processor 30 to wake up, read envelope buffer 28, and execute voice activity detection algorithms on the data stored in envelope buffer 28. In some embodiments, timer 32 may be an external integrated circuit and in other embodiments, timer 32 may be included as a peripheral component on the same silicon die as processor 30. Various other implementations for timer 32 may be used within the broad scope of the embodiments. According to some embodiments, the second data stored in envelope buffer 28 may be applied to a log block, which outputs the envelope signal in dB. The log block can make the voice-detection independent of absolute signal level. Alternatively, a divider (e.g., power divider in hardware, or equivalent software implementation) can be used to take a ratio of energies represented by the first data. The log output may be applied to a negative peak-detector with a hold function. If the input to the negative peak detector is less than a previously stored negative peak, the negative peak may be set equal to the input.

If the input is greater than the stored negative peak, and the condition is met for some fixed predetermined number of clock cycles equal to the hold count parameter (which may be typically set to a time period in a range from 0.5 s to 4 s), the stored negative peak may be incremented by a fixed amount. The difference between the envelope and the output of the negative peak detector may be applied to a threshold. If the difference exceeds the threshold, the output can likely indicate an activity (e.g., onset of a voice signal). In some embodiments, the log block or divider and the negative peak detector may be implemented as a software module embedded in, or separate from, envelope detector 24.

Based on the VAD algorithm results, processor 30 may determine that an activity has been detected. Processor 30 may thereupon perform other appropriate tasks, such as alerting other components of the larger system of which system 10 is a part, or performing keyword matching algorithms to interpret the voice signal (if the detected activity is the onset of the voice signal). Processor 30 may read the first data from audio buffer 18 to determine a match with one or more keywords from a set of stored potential keywords (e.g., "start" "on" etc.). If the keyword is detected, processor 30 may signal other components in system 10 to take some action, or processor 30 may execute some other task that is appropriate to control system 10. If the keyword is not found, processor 30 may return to the idle state and wait for another VAD event (e.g., onset of auditory signal). Any suitable keyword detection algorithm may be used within the broad scope of the embodiments of system 10.

Figure 2:
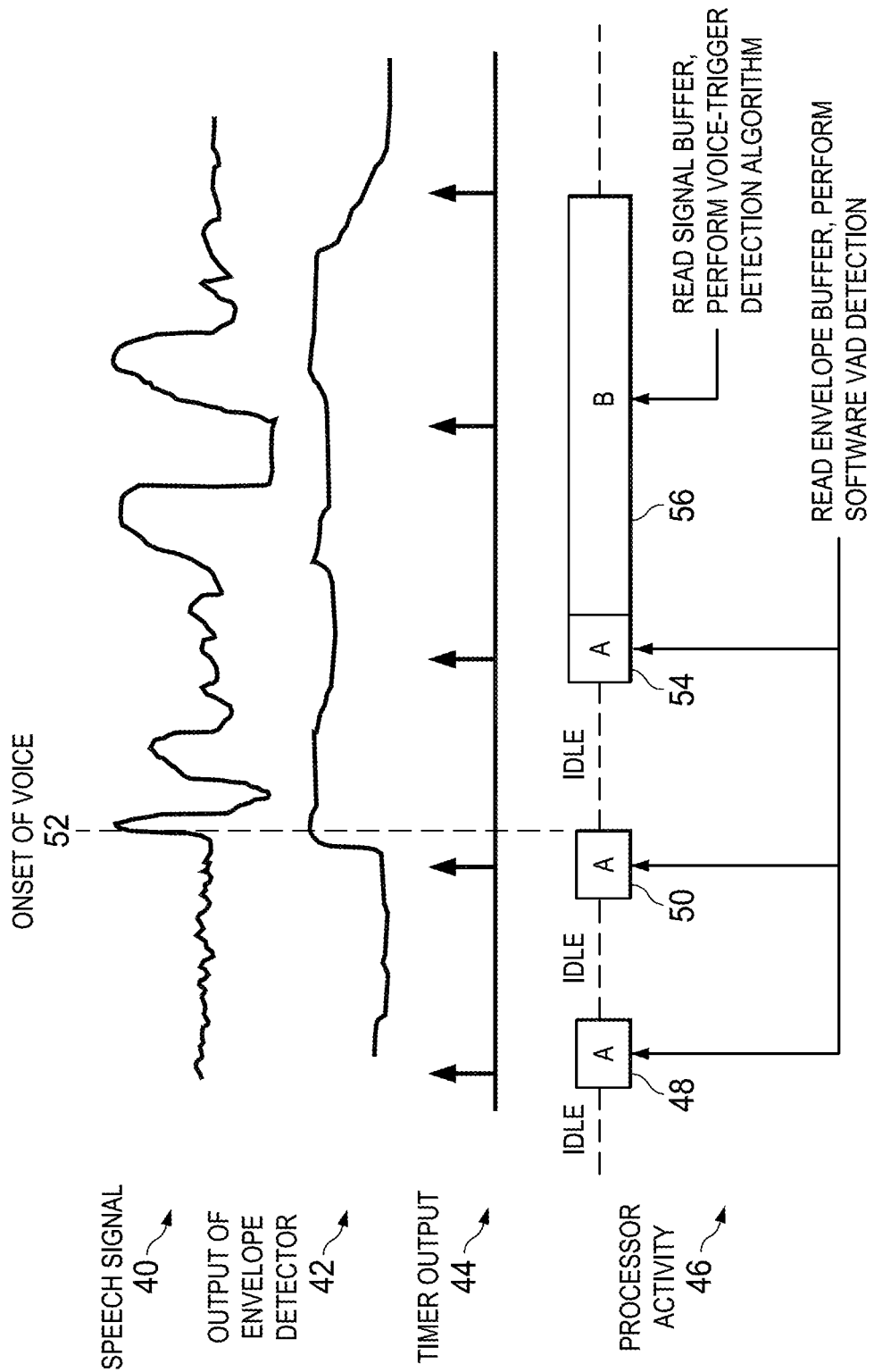
FIG. 2 is a simplified block diagram of example details of the system according to one embodiment.

Turning to FIG. 2, FIG. 2 is a simplified diagram illustrating example details of an embodiment of system 10. A speech signal 40 detected by sensor 12 may be stored in digital form in audio buffer 18. Speech signal 40 may result in an output 42 of envelope detector 24. A timer output 44 indicates the time instants at which timer 32 may output a signal to processor 30. On each "tick" (e.g., timer output 44(1), 44(2), 44(3), etc.) of timer 32, processor 30 may wake up and perform various activities 46. For example, processor 30 may perform activity 48 at timer output 44(1). Activity 48 may include reading envelope buffer 28 and executing VAD algorithms on the data stored in envelope buffer 28.

Assume, merely for the sake of illustration, and not as a limitation, that no voice activity is detected for the first two timer outputs 44(1) and 44(2). Processor 30 may perform activity 48 at timer output 44(1), and another identical activity 50 at timer output 44(2). Assume that voice activity begins at onset of voice 52, sometime between timer outputs 44(1) and 44(2). The onset of voice 52 may cause a change in data in envelope buffer 28, as evidenced by output of envelope detector 42. At timer output 44(3), processor 30 may perform activity 54, including reading envelope buffer 28 and executing VAD algorithms on the data stored in envelope buffer 28. The VAD algorithms would indicate that a VAD event has been detected.

Processor 30 may perform activity 56, which can include reading audio buffer 18 and performing a voice-trigger matching algorithm (e.g., keyword matching algorithm). Any suitable voice activity detection algorithms can be used as a trigger to activate an automatic speech recognition module (e.g., of a mobile device or other larger system of which system 10 is a part). If the input speech signal can be recognized as a predefined keyword coming from a legitimate user, it can be utilized as a trigger. Processor 30 may initially start from the beginning of audio buffer 18, and may catch up with the real-time data stream, in which case processor 30 may process incoming data samples as they enter audio buffer 18. Processor 30 may stop processing the data when the keyword is detected, or when the software VAD operation (which can run in parallel) shows that the voice activity has stopped.

Figure 3:
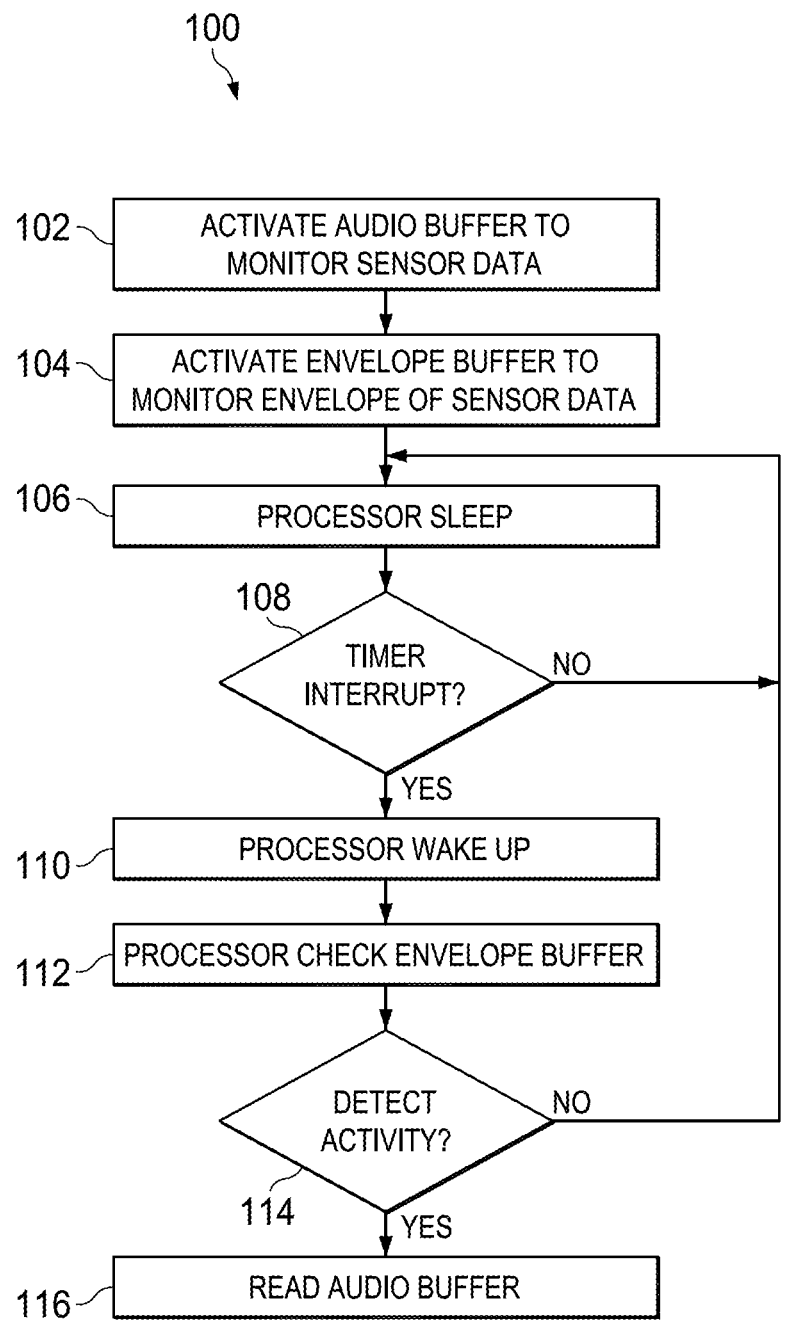
FIG. 3 is a simplified flow diagram illustrating example operations that may be associated with an example embodiment of the system.

Turning to FIG. 3, FIG. 3 is a simplified flow diagram illustrating example operations 100 that may be associated with an embodiment of system 10. At 102, audio buffer 18 may be activated to monitor audio, and store data from sensor 12. At 104, envelope buffer 28 may be activated to monitor the envelope of the data from sensor 12. At 106, processor 30 may be put to sleep (e.g., standby mode). At 108, a determination may be made whether a timer interrupt has been received at processor 30. If not, the operations may revert to 106. If a timer interrupt has been received at processor 30, at 110, processor 30 may wake up. At 112, processor 30 may check envelope buffer 28. At 114, a determination may be made whether any voice (or other) activity is detected. If no activity is detected, the operations may revert to 106. If activity is detected, at 116, processor 30 may read audio buffer 18.

Figure 4:
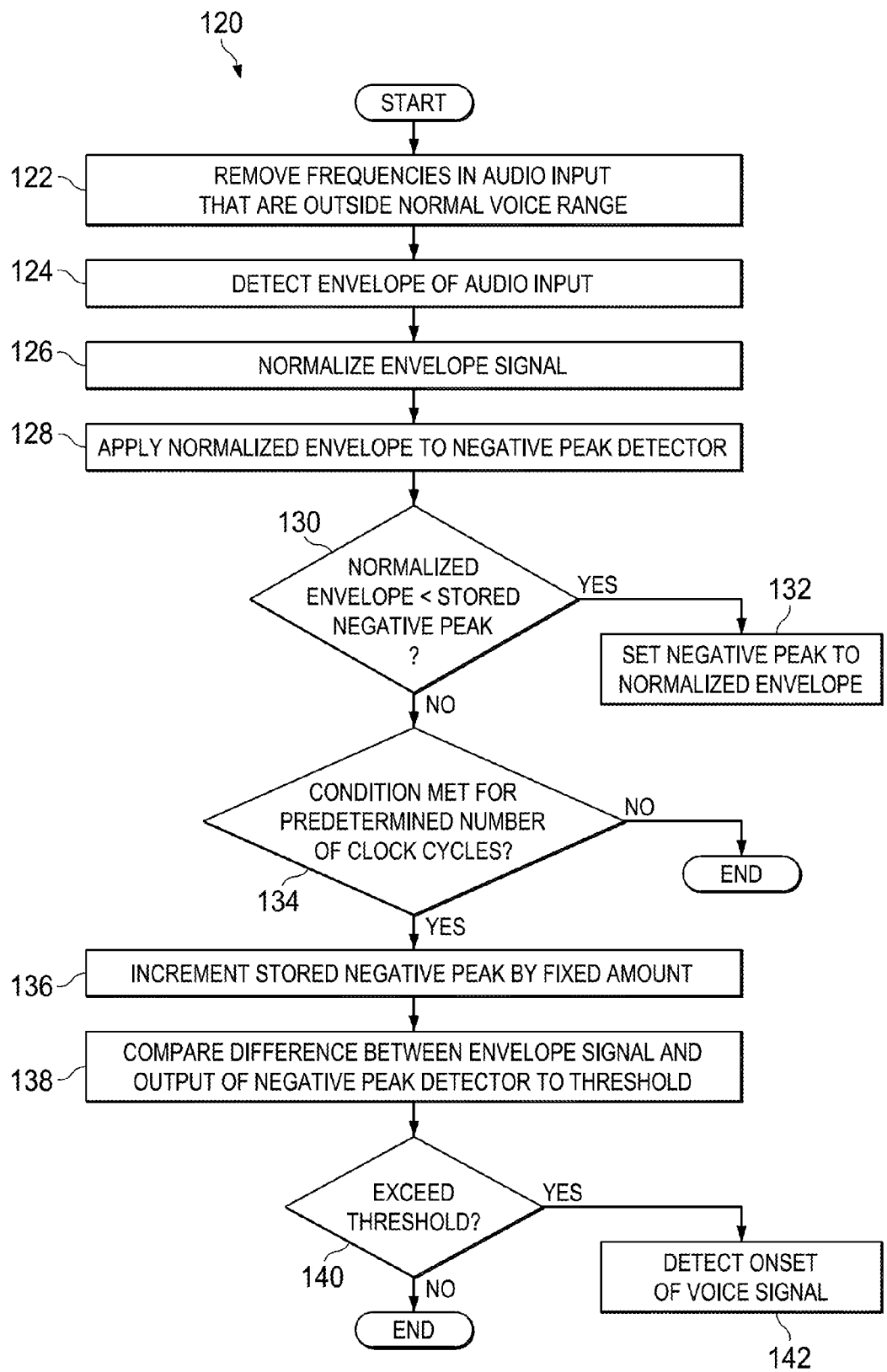
FIG. 4 is a simplified flow diagram illustrating other example operations that may be associated with an example embodiment of the system.

Turning to FIG. 4, FIG. 4 is a simplified flow diagram illustrating example operations that may be associated with voice detection according to an embodiment of system 10. At 122, frequencies in the audio input from sensor 12 that are outside the normal human voice range may be removed, for example, with bandpass 22. At 124, envelope detector 24 may detect an envelope of the audio input. At 126, the envelope may be normalized (e.g., through a divider or log block). As used herein, the term "normalize" means adjusting values from different scales to a common scale. Normalization can include rescaling, for example, using a ratio of values, and log normalization, which transforms each value using a logarithmic scale. At 128, the normalized envelope may be applied to a negative peak detector. The negative peak detector can be a data analysis software module configured to detect negative peaks in a waveform, according to some embodiments. According to other embodiments, the negative peak detector may be a hardware module, for example, implemented in conjunction with envelope detector 24. At 130, a determination may be made whether the normalized envelope is less than the negative peak value stored in system 10. If the normalized envelope is less than the negative peak value, the value stored in system 10 may be overwritten with the normalized envelope value at 132.

Otherwise, if the normalized envelope is not less than the negative peak value, at 134, a determination may be made whether the condition at 130 has been met for a predetermined number of clock cycles. If not, the process may end. If the condition at 130 has been met for a predetermined number of clock cycles, at 136, the stored negative peak value may be incremented by a fixed amount. At 138, the difference between the envelope signal and output of the negative peak detector may be compared to a threshold. At 140, a determination may be made whether the threshold has been exceeded. If not, the process may end. If the threshold has been met or exceeded, at 142, a conclusion may be made that an onset of voice signal has been detected.

Figure 5:
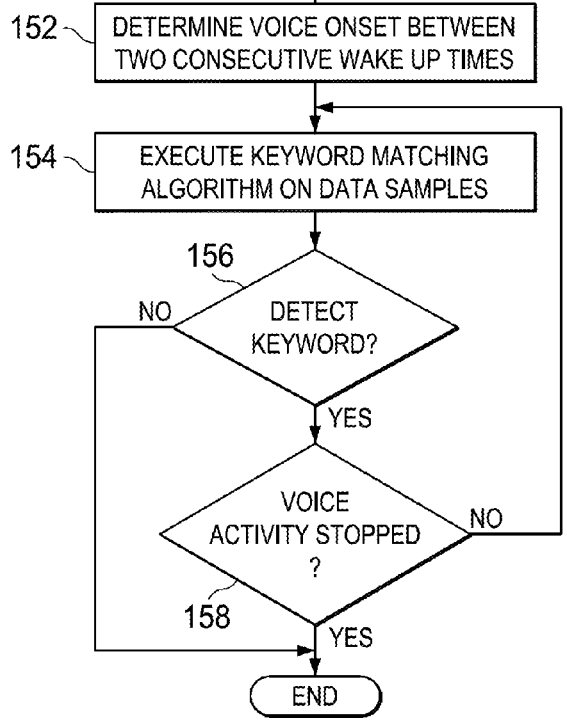
FIG. 5 is a simplified flow diagram illustrating yet other example operations that may be associated with an example embodiment of the system.

Turning to FIG. 5 FIG. 5 is a simplified flow diagram illustrating example operations 150 that may be associated with an embodiment of system 10. At 152, it may be determined that voice onset has occurred between two consecutive wake-up times of processor 30. At 154, processor 30 may execute keyword matching algorithm(s) on data samples in audio buffer 18. At 156, a determination may be made whether any keyword is detected. If the keyword is detected, processor 30 may stop further sampling of data and proceed to activate other components of the larger system (e.g., mobile device, remote control, computer, etc.) of which system 10 may be a part. If the keyword is not detected at 156, processor 30 may make a determination at 158 whether the voice activity has stopped. If yes, the process may end; if not, the process may loop back to 154, and processor 30 may continue to sample data in audio buffer 18 according to the keyword matching algorithms.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In one example embodiment, system 10 of the FIGURES may be coupled to a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

In another example embodiment, system 10 of the FIGURES may be embedded in stand-alone modules (e.g., a device with associated components and circuitry configured to perform a specific application or function) or integrated as plug-in modules into application specific hardware of electronic devices. Note that particular embodiments of the present disclosure may be readily included in a system on chip (SOC) package. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the circuit functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors and memory elements, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electronic components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electronic elements. It should be appreciated that system 10 of the FIGURES and its teachings are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a voice activity detector (VAD) comprising a processor, wherein the method comprises:
generating a first data from a sensor according to a first sampling rate;
deriving a second data from a normalized envelope of a subset of the first data according to a second sampling rate that is less than the first sampling rate;
comparing the second data with a first negative peak value;

detecting an activity if a difference between the second data and the first peak value exceeds a predetermined threshold;
comparing the second data with a second negative peak value;
incrementing the second negative peak value by a fixed amount to obtain the first negative peak value if the second data is not less than the second negative peak value during a predetermined number of clock cycles; and
setting the first negative peak value to the second negative peak value if the second data is less than the second negative peak value.

2. The method of claim 1, further comprising storing the first data in an audio buffer of the VAD.

3. The method of claim 2, further comprising storing the second data in an envelope buffer of the VAD, wherein the envelope buffer is shorter than the audio buffer.

4. The method of claim 2, further comprising:
if the activity is detected, reading the first data from the audio buffer; and
if the activity is not detected, returning the processor to an idle state.

5. The method of claim 1, further comprising sending periodically, by a timer of the VAD, an interrupt to the processor, wherein the processor wakes up on receiving the interrupt and reads the second data.

6. The method of claim 1, further comprising
generating, by a bandpass filter of the VAD, the subset of the first data;
detecting, by an envelope detector of the VAD, an envelope of the subset; and
normalizing the envelope.

7. The method of claim 6, wherein the normalizing the envelope comprises taking a ratio of energies represented by the first data.

8. The method of claim 6, wherein the normalizing the envelope comprises a log normalization of the envelope.

9. The method of claim 1, wherein the first data is generated from audio signals.

10. The method of claim 9, wherein frequencies beyond a normal human voice range are filtered out of the audio signals to generate the first subset.

11. The method of claim 1, wherein the activity comprises an onset of a voice signal.

12. The method of claim 1, wherein the detecting the envelope is based on a parameter of the subset selected from a group consisting of: root mean square (RMS), average, peak and quasi-peak.

13. The method of claim 1, further comprising:
determining that the activity occurred between two consecutive wake-up times of the processor;
executing a keyword matching algorithm on the first data; and
if a matching keyword is found, performing another task based on the matching keyword.

14. A voice activity detector (VAD) apparatus, comprising:
an audio buffer that stores a first data from a sensor according to a first sampling rate;
a bandpass filter that generates a subset of the first data;
an envelope detector that detects an envelope of the subset and normalizes the envelope;
an envelope buffer that stores a second data derived from the normalized envelope according to a second sampling rate that is less than the first sampling rate; and
a processor that reads the second data from the envelope buffer and detects an activity if the second data is greater by a predetermined threshold than a first negative peak value, wherein the processor further compares the second data with a second negative peak value, wherein if the second data is not less than the second negative peak value during a predetermined number of clock cycles, the processor increments the second negative peak value by a fixed amount to obtain the first negative peak value, and if the second data is less than the second negative peak value, the processor sets the first negative peak value to the second negative peak value.

15. The VAD apparatus of Claim 14, wherein the processor returns to an idle state if the second data does not indicate the activity.

16. The VAD apparatus of Claim 14, further comprising a direct memory access (DMA) controller that facilitates reading the audio buffer and the envelope buffer.

17. The VAD apparatus of Claim 14, further comprising an analog-to-digital converter (ADC) that generates the first data in a digital format according to the first sampling rate from an analog signal at the sensor.

18. The VAD apparatus of Claim 14, wherein the envelope buffer is shorter than the audio buffer.

19. The VAD apparatus of Claim 14, further comprising a decimator, wherein the decimator derives the second data by downsampling the normalized envelope.

20. The VAD apparatus of Claim 14, wherein the bandpass filter is configured to filter the first data and feed the filtered data to the envelope detector.

\* \* \* \* \*